(12) United States Patent
McColl et al.

(10) Patent No.: US 7,901,583 B2
(45) Date of Patent: Mar. 8, 2011

(54) TREATMENT OF AQUEOUS SUSPENSIONS

(75) Inventors: Philip McColl, Mackay (AU); Stephen Scammell, Bardon (AU)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 12/644,070

(22) Filed: Dec. 22, 2009

(65) Prior Publication Data

US 2010/0098493 A1 Apr. 22, 2010

Related U.S. Application Data

(63) Continuation of application No. 10/548,143, filed as application No. PCT/EP2004/000042 on Jan. 7, 2004, now abandoned.

(30) Foreign Application Priority Data

May 7, 2003 (GB) .................................. 0310419.7

(51) Int. Cl.
*C02F 11/14* (2006.01)
(52) U.S. Cl. ......... 210/710; 210/712; 210/732; 210/734; 210/747; 405/128.75; 423/121; 423/122
(58) Field of Classification Search ................... 210/710
See application file for complete search history.

(56) References Cited

U.S. PATENT DOCUMENTS

| | | | |
|---|---|---|---|
| 3,312,070 A | 4/1967 | Matsuo et al. | 61/36 |
| 3,524,682 A | 8/1970 | Booth | 302/66 |
| 3,707,523 A | 12/1972 | Ledden et al. | 260/41 |
| 3,836,200 A | 9/1974 | Booth | 302/66 |
| 3,917,529 A | 11/1975 | Madole et al. | 210/54 |
| 4,347,140 A | 8/1982 | Condolios et al. | 210/710 |
| 4,506,062 A | 3/1985 | Flesher et al. | 526/211 |
| 4,528,321 A | 7/1985 | Allen et al. | 524/761 |
| 4,599,379 A | 7/1986 | Flesher et al. | 524/801 |
| 4,673,704 A | 6/1987 | Flesher et al. | 524/519 |
| 4,692,237 A | 9/1987 | Hsu et al. | 208/177 |
| 4,701,264 A | 10/1987 | Braun | 210/734 |
| 4,720,346 A | 1/1988 | Flesher et al. | 210/734 |
| 4,767,540 A | 8/1988 | Spitzer et al. | 210/728 |
| 4,911,848 A | 3/1990 | Cardini et al. | 210/710 |
| 5,043,077 A | 8/1991 | Chandler et al. | 210/698 |
| 5,391,597 A | 2/1995 | Davies et al. | 524/2 |

(Continued)

FOREIGN PATENT DOCUMENTS

EP 0 314 855 5/1989

(Continued)

OTHER PUBLICATIONS

English Language abstract from esp@cenet printed Nov. 21, 2005 of JP 5317899.

(Continued)

*Primary Examiner* — Peter A Hruskoci
(74) *Attorney, Agent, or Firm* — Shiela A. Loggins

(57) ABSTRACT

A process in which material comprising an aqueous liquid with dispersed particulate solids is transferred as a fluid to a deposition area, then allowed to stand and rigidify, and in which rigidification is improved while retaining the fluidity of the material during transfer, by combining with the material an effective rigidifying amount of aqueous solution of a water-soluble polymer. The process is particularly suitable for the treatment of the tailings underflow resulting from a mineral processing operation and the co-disposal of fine and coarse tailings fractions. In addition, liquor released during the rigidification step is of high clarity.

19 Claims, 3 Drawing Sheets

U.S. PATENT DOCUMENTS

| | | | | |
|---|---|---|---|---|
| 5,530,069 | A | 6/1996 | Neff et al. | 525/329.4 |
| 5,636,942 | A | 6/1997 | Brackebusch | 405/129 |
| 5,723,042 | A | 3/1998 | Strand et al. | 208/391 |
| 5,788,867 | A | 8/1998 | Pearson | 210/733 |
| 5,922,207 | A | 7/1999 | Willis et al. | 210/710 |
| 6,001,920 | A | 12/1999 | Ghafoor et al. | 524/500 |
| 6,031,037 | A | 2/2000 | Ghafoor et al. | 524/388 |
| 6,821,440 | B2 | 11/2004 | Gallagher et al. | 210/32 |
| 6,979,405 | B2 | 12/2005 | Weir | 210/727 |
| 2003/0010714 | A1 | 1/2003 | Gallagher et al. | 210/634 |

FOREIGN PATENT DOCUMENTS

| | | |
|---|---|---|
| EP | 0 388 108 | 9/1990 |
| FR | 2 384 903 | 3/1977 |
| GB | 826 770 | 1/1960 |
| GB | 1 226 141 | 3/1971 |
| GB | 1 401 307 | 7/1995 |
| JP | 53/17899 | 12/1993 |
| WO | 96/05146 | 2/1996 |
| WO | 98/29604 | 7/1998 |
| WO | 01/92167 | 12/2001 |
| WO | 02/44093 | 6/2002 |

OTHER PUBLICATIONS

Q. Nguyen et al., Int. J. Miner. Process 54(1998) 217-233.

F. Sofra et al., Chemical Engineering Journal 86 (2002) pp. 319-330.

F. Sofra et al., Tailings and Mine Waste '00;2000 Balkema, Rotterdam, ISBN 90 5809 126 0, pp. 169-180 "Exploiting the rheology of mine tailings for dry disposal".

R. Backer et al., Report of Investigations-8581, Annex B Fine Coal—refuse slurry dewatering, pp. 1-18, 1981.

"Flocculation in Biotechnology and separation systems" Process Technology Proceedings, 4, (1986), pp. 793-801.

Light Metals 2002, Feb. 2002—pp. 115-120.

F. Sofra et al., Management of the Flow and Processing of Mining Waste Streams, Cairns, Old, May 29-31, 2002, pp. 251-257.

NEXGUARD/NGIT Polymer, Nov. 2001, Full Public Report, pp. 1-12.

Q. D. Nguyen et al., "Pipeline Transportation of Mineral Suspensions" Second Large Open Pit Mining Conference, Apr. 1989, pp. 73-81.

H.I. Heitner, Flocculation in biotechnology and Seperation systems, Annex E, Principal Factors Affecting Flocculation of coal refuse; pp. 793-801, 1987.

M. Belanger, "Red Mud Stacking", pp. 71-77, 2001.

Light Metals 2001, Annex J (Feb. 2000).

E. Robinsky; Tailings and Mine Waste '00 2000 Balkema, Rotterdam, ISBN 90 5809 1260, "Sustainable development in disposal of tailings" pp. 39-48.

M. Williams et al., Tailings and Mine Waste '99 1999 Balkema, Rotterdam, ISBN 90 5809 0256, "thickened tailings discharge: A review of Australian experience" pp. 125-135.

F. Billmeyer, Textbook of Polymer Science, $3^{rd}$ edition, pp. 208-210, 1984.

B. Stewart et al.,Report of Investigations 9057, Annex A, "thickening Fine Coal Refuse Slurry for Rapid Dewatering and enhanced safety" pp. 1-12.

L. Lyons et al., Water Treatment Polymers, Chapter 7, pp. 113-145, 2007.

TREATMENT OF AQUEOUS SUSPENSIONS

This application is a continuation of application Ser. No. 10/548,143, filed on May 11, 2006 now abandoned which is the National Stage of International Application PCT/EP04/000042, filed Jan. 7, 2004, the contents of which are herein incorporated by reference.

The present invention relates to the treatment of mineral material, especially waste mineral slurries. The invention is particularly suitable for the disposal of tailings and other waste material resulting from mineral processing and beneficiation processes, including the co-disposal of coarse and fine solids, as a homogenous mixture.

Processes of treating mineral ores in order to extract mineral values will normally result in waste material. Often the waste material consists of an aqueous slurry or sludge comprising particulate mineral material, for instance clay, shale, sand, grit, metal oxides etc admixed with water.

In some cases the waste material such as mine tailings can be conveniently disposed of in an underground mine to form backfill. Generally backfill waste comprises a high proportion of coarse large sized particles together with other smaller sized particles and is pumped into the mine as slurry where it is allowed to dewater leaving the sedimented solids in place. It is common practice to use flocculants to assist this process by flocculating the fine material to increase the rate of sedimentation. However, in this instance, the coarse material will normally sediment at a faster rate than the flocculated fines, resulting in a heterogeneous deposit of coarse and fine solids.

For other applications it may not be possible to dispose of the waste in a mine. In these instances, it is common practice to dispose of this material by pumping the aqueous slurry to lagoons, heaps or stacks and allowing it to dewater gradually through the actions of sedimentation, drainage and evaporation.

There is a great deal of environmental pressure to minimise the allocation of new land for disposal purposes and to more effectively use the existing waste areas. One method is to load multiple layers of waste onto an area to thus form higher stacks of waste. However, this presents a difficulty of ensuring that the waste material can only flow over the surface of previously rigidified waste within acceptable boundaries, is allowed to rigidify to form a stack, and that the waste is sufficiently consolidated to support multiple layers of rigidified material, without the risk of collapse or slip. Thus the requirements for providing a waste material with the right sort of characteristics for stacking is altogether different from those required for other forms of disposal, such as back-filling within a relatively enclosed area.

In a typical mineral processing operation, waste solids are separated from solids that contains mineral values in an aqueous process. The aqueous suspension of waste solids often contain clays and other minerals, and are usually referred to as tailings. These solids are often concentrated by a flocculation process in a thickener to give a higher density underflow and to recover some of the process water. It is usual to pump the underflow to a surface holding area, often referred to as a tailings pit or dam. Once deposited at this surface holding area, water will continue to be released from the aqueous suspension resulting in further concentration of the solids over a period of time. Once a sufficient volume of water has been collected this is usually pumped back to the mineral processing plant.

The tailings dam is often of limited size in order to minimise the impact on the environment. In addition, providing larger dams can be expensive due to the high costs of earth moving and the building of containment walls. These dams tend to have a gently sloping bottom which allows any water released from the solids to collect in one area and which can then be pumped back to the plant. A problem that frequently occurs is when fine particles of solids are carried away with the run-off water, thus contaminating the water and having a detrimental impact on subsequent uses of the water.

In many mineral processing operations, for instance a mineral sands beneficiation process, it is also common to produce a second waste stream comprising of mainly coarse (>0.1 mm) mineral particles. It is particularly desirable to dispose of the coarse and fine waste particles as a homogeneous mixture as this improves both the mechanical properties of the dewatered solids, greatly reducing the time and the cost eventually required to rehabilitate the land. However, this is not usually possible because even if the coarse waste material is thoroughly mixed into the aqueous suspension of fine waste material prior to deposition in the disposal area, the coarse material will settle much faster than the fine material resulting in banding within the dewatered solids. Furthermore, when the quantity of coarse material to fine material is relatively high, the rapid sedimentation of the coarse material may produce excessive beach angles which promotes the run off of aqueous waste containing high proportions of fine particles, further contaminating the recovered water. As a result, it is often necessary to treat the coarse and fine waste streams separately, and recombine these material by mechanically re-working, once the dewatering process is complete.

Attempts have been made to overcome all the above problems by treating the feed to the tailings dam using a coagulant or a flocculant to enhance the rate of sedimentation and/or improve the clarity of the released water. However, this has been unsuccessful as these treatments have been applied at conventional doses and this has brought about little or no benefit in either rate of compaction of the fine waste material or clarity of the recovered water.

It would therefore be desirable to provide treatment which provides more rapid release of water from the suspension of solids. In addition it will be desirable to enable the concentrated solids to be held in a convenient manner that prevents both segregation of any coarse and fine fractions, and prevents contamination of the released water whilst at the same time minimises the impact on the environment.

In the Bayer process for recovery of alumina from bauxite, the bauxite is digested in an aqueous alkaline liquor to form sodium aluminate which is separated from the insoluble residue. This residue consists of both sand, and fine particles of mainly ferric oxide. The aqueous suspension of the latter is known as red mud.

After the primary separation of the sodium aluminate solution from the insoluble residue, the sand (coarse waste) is separated from the red mud. The supernatant liquor is further processed to recover aluminate. The red mud is then washed in a plurality of sequential washing stages, in which the red mud is contacted by a wash liquor and is then flocculated by addition of a flocculating agent. After the final wash stage the red mud slurry is thickened as much as possible and then disposed of. Thickening in the context of this specification means that the solids content of the red mud is increased. The final thickening stage may comprise settlement of flocculated slurry only, or sometimes, includes a filtration step. Alternatively or additionally, the mud may be subjected to prolonged settlement in a lagoon. In any case, this final thickening stage is limited by the requirement to pump the thickened aqueous suspension to the disposal area.

The mud can be disposed of and/or subjected to further drying for subsequent disposal on a mud stacking area. To be suitable for mud stacking the mud should have a high solids content and, when stacked, should not flow but should be relatively rigid in order that the stacking angle should be as high as possible so that the stack takes up as little area as possible for a given volume. The requirement for high solids content conflicts with the requirement for the material to remain pumpable as a fluid, so that even though it may be possible to produce a mud having the desired high solids content for stacking, this may render the mud unpumpable.

The sand fraction removed from the residue is also washed and transferred to the disposal area for separate dewatering and disposal.

EP-A-388108 describes adding a water-absorbent, water-insoluble polymer to a material comprising an aqueous liquid with dispersed particulate solids, such as red mud, prior to pumping and then pumping the material, allowing the material to stand and then allowing it to rigidify and become a stackable solid. The polymer absorbs the aqueous liquid of the slurry which aids the binding of the particulate solids and thus solidification of the material. However this process has the disadvantage that it requires high doses of absorbent polymer in order to achieve adequate solidification. In order to achieve a sufficiently rigidified material it is often necessary to use doses as high as 10 to 20 kilograms per tonne of mud. Although the use of water swellable absorbent polymer to rigidify the material may appear to give an apparent increase in solids, the aqueous liquid is in fact held within the absorbent polymer. This presents the disadvantage that as the aqueous liquid has not actually been removed from the rigidified material and under certain conditions the aqueous liquid could be desorbed subsequently and this could risk re-fluidisation of the waste material, with the inevitable risk of destabilising the stack.

WO-A-96/05146 describes a process of stacking an aqueous slurry of particulate solids which comprises admixing an emulsion of a water-soluble polymer dispersed in a continuous oil phase with the slurry. Preference is given to diluting the emulsion polymer with a diluent, and which is preferably in a hydrocarbon liquid or gas and which will not invert the emulsion. Therefore it is a requirement of the process that the polymer is not added in to the slurry as an aqueous solution.

WO-A-0192167 describes a process where a material comprising a suspension of particulate solids is pumped as a fluid and then allowed to stand and rigidify. The rigidification is achieved by introducing into the suspension particles of a water soluble polymer which has an intrinsic viscosity of at least 3 dl/g. This treatment enables the material to retain its fluidity was being pumped, but upon standing causes the material to rigidify. This process has the benefit that the concentrated solids can be easily stacked, which minimises the area of land required for disposal. The process also has the advantage over the use of cross linked water absorbent polymers in that water from the suspension is released rather than being absorbed and retained by the polymer. The importance of using particles of water soluble polymer is emphasised and it is stated that the use of aqueous solutions of the dissolved polymer would be ineffective. Very efficient release of water and convenient storage of the waste solids is achieved by this process, especially when applied to a red mud underflow from the Bayer alumina process.

However, despite the improvements brought about by WO-A-0192167, particularly in the treatment of red mud, there is still a need to further improve the rigidification of suspensions of materials and further improve upon the clarity of liquor released. In particular, an objective of the present invention is to find a more suitable method for treating coarse and/or fine particulate waste material from mineral sands, alumina or other mineral processing operations in order to provide better release of liquor and a more effective means of disposing of the concentrated solids. Furthermore, there is a need to improve the dewatering of suspensions of waste solids that have been transferred as a fluid to a settling area for disposal and provide improvements in the clarity of run-off water. In particular, it would be desirable to provide a more effective treatment of waste suspensions transferred to disposal areas, for instance tailings dams, ensuring fast, efficient concentration and more environmentally friendly storage of solids and improve clarity of released liquor.

In one aspect of the present invention, we provide a process in which material comprising an aqueous liquid with dispersed particulate solids is transferred as a fluid to a deposition area, then allowed to stand and rigidify, and in which rigidification is improved whilst retaining the fluidity of the material during transfer, by combining with the material an effective rigidifying amount of aqueous solution of a water-soluble polymer.

In a second aspect of the present invention, we provide a process in which the aqueous liquid contains dispersed particulate solids with a bimodal distribution of particle sizes and following treatment with an effective amount of aqueous solution of a water soluble polymer, on standing, rigidifies without significant segregation of the coarse and fine fractions of particulate solids.

The addition of the aqueous solution of water-soluble polymer to the material allows it to retain sufficient fluidity during transfer and then once the material is allowed to stand it will form a solid mass strong enough to support subsequent layers of rigidified material. We have unexpectedly found that the addition of the aqueous solution of polymer to the material does not cause instant rigidification or substantially any settling of the solids prior to standing.

Figure 1:
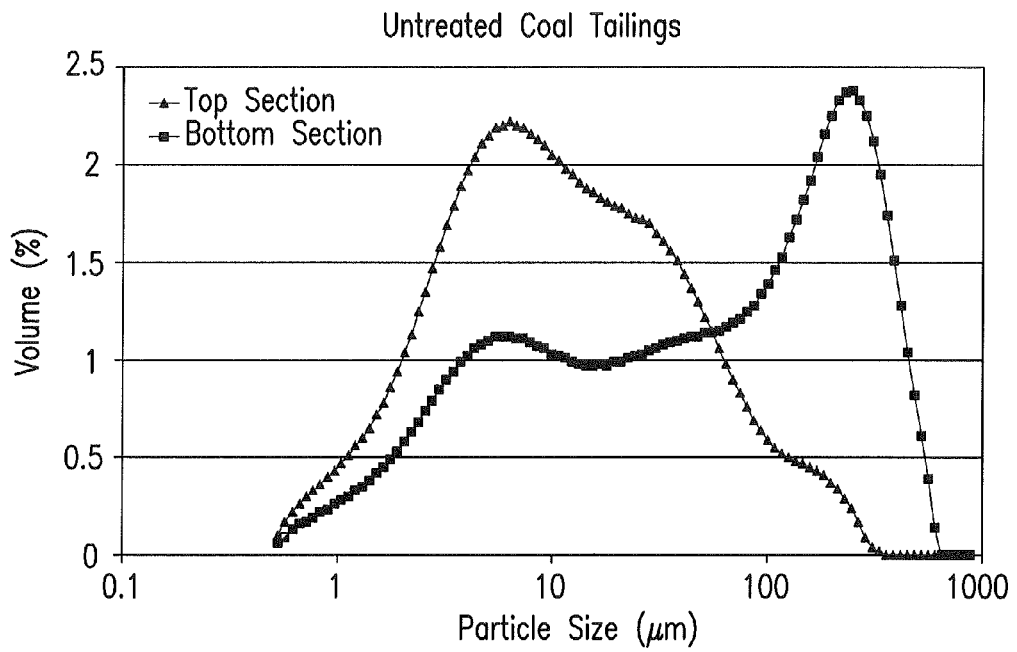
FIG. 1 and FIG. 2 graphically represent the particle size distribution of untreated and treated coal (740 gpt of Polymer 2A) tailings respectively from example 10.

Generally suspended solids will be concentrated in a thickener and this material will leave the thickener as an underflow which will be pumped along a conduit to a deposition area. The conduit is any convenient means for transferring the material to the deposition area and may for instance be a pipe or a trench. The material remains fluid and pumpable during the transfer stage until the material is allowed to stand.

Desirably the process of the invention is part of the mineral processing operation in which an aqueous suspension of waste solids is optionally flocculated in a vessel to form a supernatant layer comprising an aqueous liquor and an underflow layer comprising thickened solids which form the material. The supernatant layer will be separated from the under flow in the vessel and typically recycled or subjected to further processing. The aqueous suspension of waste solids or optionally, the thickened underflow is transferred, usually by pumping, to a deposition area, which may for instance be a tailings dam or lagoon. The material may consist of only mainly fine particles, or a mixture of fine and coarse particles. Optionally, additional coarse particles may be combined with the aqueous suspension at any convenient point prior to discharge at the deposition area. Once the material has reached the deposition area it is allowed to stand and rigidification takes place. The aqueous polymer solution may be added to the material in an effective amount at any convenient point, typically during transfer. In some cases the aqueous suspension may be transferred first to a holding vessel before being transferred to the deposition area.

Suitable doses of polymer range from 10 grams to 10,000 grams per tonne of material solids. Generally the appropriate dose can vary according to the particular material and material solids content. Preferred doses are in the range 30 to 3,000 grams per tonne, while more preferred doses are in the range of from 60 to 200 or 400 grams per tonne.

The material particles are usually inorganic and/or usually a mineral. Typically the material may be derived from or contain filter cake, tailings, thickener underflows, or unthickened plant waste streams, for instance other mineral tailings or slimes, including phosphate, diamond, gold slimes, mineral sands, tails from zinc, lead, copper, silver, uranium, nickel, iron ore processing, coal or red mud. The material may be solids settled from the final thickener or wash stage of a mineral processing operation. Thus the material desirably results from a mineral processing operation. Preferably the material comprises tailings.

The fine tailings or other material which is pumped may have a solids content in the range 10% to 80% by weight. The slurries are often in the range 20% to 70% by weight, for instance 45% to 65% by weight. The sizes of particles in a typical sample of the fine tailings are substantially all less than 25 microns, for instance about 95% by weight of material is particles less than 20 microns and about 75% is less than 10 microns. The coarse tailings are substantially greater than 100 microns, for instance about 85% is greater than 100 microns but generally less than 10,000 microns. The fine tailings and coarse tailings may be present or combined together in any convenient ratio provided that material remains pumpable.

The dispersed particulate solids may have a bimodal distribution of particle sizes. Typically this bimodal distribution may comprise a fine fraction and a coarse fraction, in which the fine fraction peak is substantially less than 25 microns and the coarse fraction peak is substantially greater than 75 microns.

We have found better results are obtained when the material is relatively concentrated and homogenous. It may also be desirable to combine the addition of the polymer solution with other additives. For instance the flow properties of the material through a conduit may be facilitated by including a dispersant. Typically where a dispersant is included it would be included in conventional amounts. However, we have found that surprisingly the presence of dispersants or other additives does not impair the rigidification of the material on standing. It may also be desirable to pre-treat the material with either an inorganic or organic coagulant to pre-coagulate the fine material to aid its retention in the rigidified solids.

Thus in the present invention the polymer solution is added directly to the aforementioned material. The polymer solution may consist wholly or partially of water-soluble polymer. Thus the polymer solution may comprise a blend of cross-linked polymer and water soluble polymer, provided sufficient of the polymer is in solution or behaves as though it is in solution to bring about rigidification on standing.

This may be a physical blend of swellable polymer and soluble polymer or alternatively is a lightly cross-linked polymer for instance as described in EP202780. Although the polymeric particles may comprise some cross-linked polymer it is essential to the present invention that a significant amount of water soluble polymer is present. When the polymeric particles comprise some swellable polymer it is desirable that at least 80% of the polymer is water-soluble.

Preferably the aqueous solution of polymer comprises polymer which is wholly or at least substantially water soluble. The water soluble polymer may be branched by the presence of branching agent, for instance as described in WO-A-9829604, for instance in claim 12, or alternatively the water soluble polymer is substantially linear.

Preferably the water soluble polymer is of moderate to high molecular weight. Desirably it will have an intrinsic viscosity of at least 3 dl/g (measured in 1M NaCl at 25° C.) and generally at least 5 or 6 dl/g, although the polymer may be of significantly high molecular weight and exhibit an intrinsic viscosity of 25 dl/g or 30 dl/g or even higher. Preferably the polymer will have an intrinsic viscosity in the range of 8 dl/g to 25 dl/g, more preferably 11 dl/g or 12 dl/g to 18 dl/g or 20 dl/g.

The water soluble polymer may be a natural polymer, for instance polysaccharides such as starch, guar gum or dextran, or a semi-natural polymer such as carboxymethyl cellulose or hydroxyethyl cellulose. Preferably the polymer is synthetic and preferably it is formed from an ethylenically unsaturated water-soluble monomer or blend of monomers.

The water soluble polymer may be cationic, non-ionic, amphoteric, or anionic. The polymers may be formed from any suitable water-soluble monomers. Typically the water soluble monomers have a solubility in water of at least 5 g/100 cc at 25° C. Particularly preferred anionic polymers are formed from monomers selected from ethylenically unsaturated carboxylic acid and sulphonic acid monomers, preferably selected from (meth) acrylic acid, allyl sulphonic acid and 2-acrylamido-2-methyl propane sulphonic acid (AMPS), and their salts, optionally in combination with non-ionic co-monomers, preferably selected from (meth) acrylamide, hydroxy alkyl esters of (meth) acrylic acid and N-vinyl pyrrolidone.

Preferred non-ionic polymers are formed from ethylenically unsaturated monomers selected from (meth) acrylamide, hydroxy alkyl esters of (meth) acrylic acid and N-vinyl pyrrolidone.

Preferred cationic polymers are formed from ethylenically unsaturated monomers selected from dimethyl amino ethyl (meth)acrylate-methyl chloride, (DMAEA.MeCl) quat, diallyl dimethyl ammonium chloride (DADMAC), trimethyl amino propyl (meth) acrylamide chloride (ATPAC) optionally in combination with non-ionic co-monomers, preferably selected from (meth) acrylamide, hydroxy alkyl esters of (meth) acrylic acid and N-vinyl pyrrolidone.

In some instances, it has been found advantageous to separately add combinations of polymer types. Thus an aqueous solution of an anionic, cationic or non-ionic polymer may be added to the above mentioned material first, followed by a second dose of either a similar or different water soluble polymer of any type.

In the invention, the water soluble polymer may be formed by any suitable polymerisation process. The polymers may be prepared for instance as gel polymers by solution polymerisation, water-in-oil suspension polymerisation or by water-in-oil emulsion polymerisation. When preparing gel polymers by solution polymerisation the initiators are generally introduced into the monomer solution.

Optionally a thermal initiator system may be included. Typically a thermal initiator would include any suitable initiator compound that releases radicals at an elevated temperature, for instance azo compounds, such as azo-bis-isobutyronitrile. The temperature during polymerisation should rise to at least 70° C. but preferably below 95° C. Alternatively polymerisation may be effected by irradiation (ultra violet light, microwave energy, heat etc.) optionally also using suitable radiation initiators. Once the polymerisation is complete and the polymer gel has been allowed to cool sufficiently the gel can be processed in a standard way by first comminuting the gel into smaller pieces, drying to the substantially dehydrated polymer followed by grinding to a powder. Alternatively polymer gels may be supplied in the form of polymer gels, for instance as neutron type gel polymer logs.

Such polymer gels may be prepared by suitable polymerisation techniques as described above, for instance by irradiation. The gels may be chopped to an appropriate size as required and then on application mixed with the material as partially hydrated water soluble polymer particles.

The polymers may be produced as beads by suspension polymerisation or as a water-in-oil emulsion or dispersion by water-in-oil emulsion polymerisation, for example according to a process defined by EP-A-150933, EP-A-102760 or EP-A126528.

Alternatively the water soluble polymer may be provided as a dispersion in an aqueous medium. This may for instance be a dispersion of polymer particles of at least 20 microns in an aqueous medium containing an equilibrating agent as given in EP-A-170394. This may for example also include aqueous dispersions of polymer particles prepared by the polymerisation of aqueous monomers in the presence of an aqueous medium containing dissolved low IV polymers such as poly diallyl dimethyl ammonium chloride and optionally other dissolved materials for instance electrolyte and/or multi-hydroxy compounds e.g. polyalkylene glycols, as given in WO-A-9831749 or WO-A-9831748.

The aqueous solution of water-soluble polymer is typically obtained by dissolving the polymer in water or by diluting a more concentrated solution of the polymer. Generally solid particulate polymer, for instance in the form of powder or beads, is dispersed in water and allowed to dissolve with agitation. This may be achieved using conventional make up equipment. Desirably, the polymer solution can be prepared using the Auto Jet Wet (trademark) supplied by Ciba Specialty Chemicals. Alternatively, the polymer may be supplied in the form of a reverse phase emulsion or dispersion which can then be inverted into water.

The aqueous polymer solution may be added in any suitable concentration. It may be desirable to employ a relatively concentrated solution, for instance up to 10% or more based on weight of polymer in order to minimise the amount of water introduced into the material. Usually though it will be desirable to add the polymer solution at a lower concentration to minimise problems resulting from the high viscosity of the polymer solution and to facilitate distribution of the polymer throughout the material. The polymer solution can be added at a relatively dilute concentration, for instance as low as 0.01% by weight of polymer. Typically the polymer solution will normally be used at a concentration between 0.05 and 5% by weight of polymer. Preferably the polymer concentration will be the range 0.1% to 2 or 3%. More preferably the concentration will range from 0.25% to about 1 or 1.5%.

In a mineral processing operation where a suspension containing solids is flocculated in a thickener in order to separate the suspension into a supernatant layer and an underflow material, the material can typically be treated at any suitable point after flocculation in the thickener but before the material is allowed to stand. A suitable and effective rigidifying amount of the water-soluble polymer solution can be mixed with the material prior to a pumping stage. In this way the polymer solution can be distributed throughout the material. Alternatively, the polymer solution can be introduced and mixed with the material during a pumping stage or subsequently. The most effective point of addition will depend upon the substrate and the distance from the thickener to the deposition area. If the conduit is relatively short any may be advantageous to dose the polymer solution close to where the material flows from the thickener. On the other hand, where the deposition area is significantly remote from the thickener in may be desirable to introduce the polymer solution closer to the outlet. In some instances in may be convenient to introduce the polymer solution into the material as it exits the outlet.

When aqueous suspensions of fine and coarse particulate materials are being combined for the purposes of co-disposal, the effective rigidifying amount of the water-soluble polymer solution will normally be added during or after the mixing of the different waste streams into a homogeneous slurry.

Preferably the material will be pumped as a fluid to an outlet at the deposition area and the material allowed to flow over the surface of rigidified material. The material is allowed to stand and rigidify and therefore forming a stack of rigidified material. This process may be repeated several times to form a stack that comprises several layers of rigidified material. The formation of stacks of rigidified material has the advantage that less area is required for disposal.

The rheological characteristics of the material as it flows through the conduit to the deposition area is important, since any significant reduction in flow characteristics could seriously impair the efficiency of the process. It is important that there is no significant settling of the solids as this could result in a blockage, which may mean that the plant has to be closed to allow the blockage to be cleared. In addition it is important that there is no significant reduction in flow characteristics, since this could drastically impair the pumpability on the material. Such a deleterious effect could result in significantly increased energy costs as pumping becomes harder and the likelihood of increased wear on the pumping equipment.

The rheological characteristics of the material as it rigidifies is important, since once the material is allowed to stand it is important that flow is minimised and that solidification of the material proceeds rapidly. If the material is too fluid then it will not form an effective stack and there is also a risk that it will contaminate water released from the material. It is also necessary that the rigidified material is sufficiently strong to remain intact and withstand the weight of subsequent layers of rigidified material being applied to it.

Preferably the process of the invention will achieve a heaped disposal geometry and will co-immobilise the fine and course fractions of the solids in the material and also allowing any released water to have a higher driving force to separate it from the material by virtue of hydraulic gravity drainage. The heaped geometry appears to give a higher downward compaction pressure on underlying solids which seems to be responsible for enhancing the rate of dewatering. We find that this geometry results in a higher volume of waste per surface area, which is both environmentally and economically beneficial.

It is not possible to achieve the objectives of the invention by adapting the flocculation step in the thickener. For instance flocculation of the suspension in the thickener to provide an underflow sufficiently concentrated such that it would stack would be of a little value since it would not be possible to pump such a concentrated underflow. Instead we have found that it is essential to treat the material that has been formed as an underflow in the thickener. It appears that separately treating the thickened solids in the underflow allows the material to rigidify effectively without compromising the fluidity during transfer.

A preferred feature of the present invention is the release of aqueous liquor that often occurs during the rigidification step. Thus in a preferred form of the invention the material is dewatered during rigidification to release liquor containing significantly less solids. The liquor can then be returned to the process thus reducing the volume of imported water required and therefore it is important that the liquor is clear and substantially free of contaminants, especially migrating particulate fines. Suitably the liquor may for instance be recycled to the thickener from which the material was separated as an underflow. Alternatively, the liquor can be recycled to the spirals or other processes within the same plant.

In a further aspect of the present invention we provide a process in which material comprising an aqueous liquid with dispersed particulate solids is transferred as a fluid to a settling area, then allowed to dewater to release liquor containing dissolved mineral values, and in which dewatering is improved whilst retaining the fluidity of the material during transfer, by combining with the material an effective dewatering amount of aqueous solution of a water-soluble polymer.

In this form of the invention the aqueous polymer solution is applied to the material in a similar manner as described above. In this case, the polymer solution is applied in an effective dewatering amount and in the same way as a first aspect of the invention it is important that the fluidity of the material is retained during transfer. The material is transferred to a settling area, which can for instance be a tailings dam or a lagoon. The dewatering step must proceed as quickly as possible such that the solids are allowed to concentrate and aqueous liquor is released. It is important that the liquor is of high clarity and not contaminated by solids, particularly fines, which would impair further processing.

Typically in a mineral processing operation, a suspension of solids is flocculated in a vessel to form a supernatant layer comprising an aqueous liquor and an underflow layer comprising thickened solids, which forms the material. The underflow-suspension flows from the vessel, is optionally combined with additional coarse particulate material, and in which the material is then pumped to a settling area where it is allowed to dewater. The aqueous polymer solution is mixed into the material after flocculating the suspension and before the material is allowed to rigidify and dewater.

The aqueous polymer solution may comprise any of the polymers and be used in a similar manner as that described above.

The following examples are intended to demonstrate the invention.

EXAMPLE 1

Polymer Preparation

The polymer samples shown in Table 1 have been prepared by the gel polymerisation method. The polymers were stirred into water to provide an aqueous solution at a concentration of 0.25%.

TABLE 1

| Sample | Polymer (% wt/wt) | Intrinsic Viscosity (dl/g) |
|---|---|---|
| A | 100% acrylamide homopolymer | 16 |
| B | 15/85 sodium acrylate/acrylamide copolymer | 18 |

TABLE 1-continued

| Sample | Polymer (% wt/wt) | Intrinsic Viscosity (dl/g) |
|---|---|---|
| C | 30/70 sodium acrylate/acrylamide copolymer | 12 |
| D | 30/70 sodium acrylate/acrylamide copolymer | 24 |
| E | 45/55 sodium acrylate/acrylamide copolymer | 16 |
| F | 75/25 sodium acrylate/acrylamide copolymer | 19 |
| G | 100% sodium acrylate homopolymer | 18 |
| H | 10/90 sodium AMPS/acrylamide copolymer | 16 |
| I | 40/60 sodium AMPS/acrylamide copolymer | 14 |
| J | 25/75 DMAEA.MeCl/acrylamide copolymer | 14 |
| K | 60/40 DMAEA.MeCl/acrylamide copolymer | 12 |
| L | 80/20 DMAEA.MeCl/acrylamide copolymer | 12 |
| M | 35/60/5 DMAEA.MeCl/acrylamide/sodium acrylate polymer | 20 |

Experimental Details

Test were carried out according to the following procedures using a tailings slurry obtained from a mineral sands operation.

TABLE 2

| | |
|---|---|
| Solids Content (% wt/wt) | 53.1 |
| Solids <75 um (% wt/wt) | 10.9 |
| Specific Gravity | 1.51 |

A) A Slump Test is conducted using the following method:
1. A cylinder, measuring 50 mm high by 50 mm in external diameter was placed on a metal surface of approximately 200×200 mm, with drainage holes to facilitate the collection of free water.
2. This cylinder is filled with the aqueous mineral slurry to the brim and levelled off.
3. The cylinder is lifted vertically off the tray, at speed, allowing the slurry to slump outwards.
4. The diameter of the resultant solids and the height, both at the edge and in the centre, is then recorded, allowing the height to be calculated as a percentage of the radius, denoted as the slump.

$$\text{slump } (\%) = \frac{(c-e)}{r} \times 100$$

where:
c=slump height at centre
e=slump height at edge
r=radius

5. Where applicable, the water released from the solids over a period of one minute is collected and both the volume and clarity or turbidity measured.

B) Treatment tests, employing samples A to M above were conducted using the following method.
1. 250 ml of the tails slurry was sampled into a 300 ml plastic beaker.
2. The slurry was then subjected to low shear mixing by pouring the sample from one 300 ml beaker to another to ensure that the sample was homogeneous.
3. The required dose of aqueous polymer solution was added to the tailings slurry and mixing continued until a consistent material was produced.
4. The treated slurry was evaluated using the slump test as described in section "A" above.

TABLE 3

| Sample | Dose (gpt) | r (mm) | c (mm) | e (mm) | Slump (%) | Released Water Volume (ml) | Turbidity (NTU) |
|---|---|---|---|---|---|---|---|
| Blank | 0 | 80 | 4 | 3 | 1 | 25 | >1000 |
| A | 125 | 24 | 52 | 14 | 158 | 95 | 23 |
|   | 250 | 33 | 32 | 13 | 58 | 89 | 57 |
| B | 125 | 28 | 41 | 16 | 89 | 43 | 23 |
|   | 250 | 23 | 52 | 6 | 200 | 46 | 116 |
| C | 62 | 28 | 42 | 17 | 89 | 57 | 23 |
|   | 125 | 24 | 51 | 22 | 121 | 25 | 24 |
| D | 62 | 30 | 41 | 17 | 80 | 50 | 19 |
|   | 125 | 25 | 47 | 18 | 116 | 54 | 20 |
| E | 62 | 30 | 38 | 18 | 67 | 27 | 72 |
|   | 125 | 24 | 50 | 13 | 154 | 61 | 179 |
| F | 62 | 38 | 27 | 12 | 39 | 47 | 119 |
|   | 125 | 23 | 51 | 27 | 104 | 56 | 51 |
| G | 125 | 25 | 50 | 18 | 128 | 57 | 25 |
|   | 250 | 23 | 51 | 22 | 126 | 47 | 95 |
| H | 125 | 35 | 33 | 12 | 60 | 41 | 119 |
|   | 250 | 24 | 52 | 19 | 138 | 71 | 69 |
| I | 62 | 48 | 23 | 6 | 35 | 45 | 108 |
|   | 125 | 24 | 53 | 10 | 179 | 85 | 29 |
| J | 125 | 58 | 13 | 4 | 16 | 45 | 547 |
|   | 250 | 23 | 53 | 21 | 139 | 80 | 21 |
| K | 125 | 25 | 49 | 19 | 120 | 52 | 14 |
|   | 250 | 24 | 52 | 19 | 138 | 75 | 14 |
| L | 62 | 40 | 25 | 7 | 45 | 35 | 117 |
|   | 125 | 23 | 51 | 20 | 135 | 68 | 20 |
| M | 125 | 34 | 33 | 15 | 53 | 51 | 208 |
|   | 250 | 25 | 51 | 18 | 132 | 60 | 108 |

The increased rigidification of the mineral tailings through the addition of the water soluble polymer is evident by the reduced slump radius and increased stacking height compared to the untreated material. In almost all tests, increases in the quantity, and significant increases in the clarity of the released liquor are also observed.

EXAMPLE 2

Polymer Preparation

The polymer samples shown in Table 1 have been prepared by a number of different polymerisation methods. The polymers were stirred into water to provide an aqueous solution at a concentration of 0.25% active polymer.

TABLE 4

| Sample | Form | Polymer (% wt/wt) | Intrinsic Viscosity (dl/g) |
|---|---|---|---|
| N | Bead | 30/70 sodium acrylate/acrylamide copolymer | 12 |
| O | Inverse Emulsion | 30/70 sodium acrylate/acrylamide copolymer | 17 |
| P | Dispersion | 30/70 sodium acrylate/acrylamide copolymer | 16 |
| Q | Solution | 100% mannich derivatised polyacrylamide | 14 |
| R | Inverse Emulsion | 25/75 DMAEA.MeCl/acrylamide copolymer | 16 |
| S | Bead | 25/75 DMAEA.MeCl/acrylamide copolymer | 8 |
| T | Dispersion | 80/20 DMAEMA.MeCl/acrylamide copolymer | 8 |
| U | Gel | 5/95 APTAC/acrylamide copolymer | 16 |
| V | powder | polyethylene oxide | n/a |
| W | solution | dextran polysaccharide | n/a |
| X | powder | guar gum | n/a |

Experimental Details

Tests were carried out according to the procedures and using the tailings slurry detailed in example 1.

TABLE 5

| Sample | Dose (gpt) | r (mm) | c (mm) | e (mm) | Slump (%) | Released Water Volume (ml) | Turbidity (NTU) |
|---|---|---|---|---|---|---|---|
| Blank | 0 | 83 | 4 | 2 | 2 | 10 | >1000 |
| N | 62 | 28 | 37 | 12 | 89 | 38 | 23 |
|   | 125 | 23 | 52 | 16 | 157 | 73 | 31 |
| O | 44 | 40 | 28 | 9 | 48 | 38 | 181 |
|   | 87 | 24 | 54 | 51 | 13 | 60 | 44 |
| P | 62 | 23 | 52 | 7 | 196 | 36 | 124 |
|   | 125 | 24 | 53 | 51 | 8 | 40 | 48 |
| Q | 55 | 48 | 22 | 6 | 33 | 52 | 285 |
|   | 90 | 25 | 49 | 21 | 112 | 76 | 26 |
| R | 175 | 29 | 39 | 17 | 76 | 44 | 32 |
|   | 350 | 24 | 51 | 23 | 117 | 52 | 158 |
| S | 125 | 48 | 22 | 7 | 31 | 36 | 124 |
|   | 250 | 26 | 50 | 26 | 92 | 57 | 10 |
| T | 125 | 30 | 38 | 17 | 70 | 38 | 34 |
|   | 250 | 23 | 52 | 40 | 52 | 44 | 72 |
| U | 250 | 29 | 37 | 19 | 62 | 33 | 24 |
|   | 375 | 24 | 53 | 23 | 125 | 71 | 18 |
| V | 250 | 29 | 39 | 15 | 83 | 53 | 29 |
|   | 500 | 28 | 34 | 15 | 68 | 32 | 113 |
| W | 375 | 65 | 10 | 5 | 8 | 35 | 271 |

EXAMPLE 3

Sample C from example 1 was tested according to the procedures and using the tailings slurry detailed in example 1 in conjunction with some additives which may be added to the slurry for other purposes.

TABLE 6

| Sample | Additive |
|---|---|
| X | organic coagulant - poly DADMAC |
| Y | inorganic coagulant - poly aluminium chloride |
| Z | organic dispersant - sodium polyacrylate |

TABLE 7

| Sample | Dose (gpt) | Sample | Dose (gpt) | r (mm) | c (mm) | e (mm) | Slump (%) |
|---|---|---|---|---|---|---|---|
| Blank | 0 | Blank | 0 | 93 | 7 | 3 | 4 |
| X | 250 | C | 94 | 23 | 52 | 29 | 100 |
| C | 94 | X | 250 | 24 | 51 | 26 | 104 |
| Y | 250 | C | 94 | 28 | 43 | 11 | 114 |
| C | 94 | Y | 250 | 30 | 45 | 17 | 93 |
| Z | 250 | C | 125 | 23 | 49 | 19 | 130 |
| C | 125 | Z | 250 | 23 | 51 | 21 | 130 |
| J | 62 | C | 62 | 28 | 43 | 15 | 100 |
| C | 62 | J | 62 | 23 | 51 | 26 | 109 |

EXAMPLE 4

Selected samples taken from example 1 were evaluated according to the procedures detailed in example 1 using a tailings slurry obtained from a lateritic nickel, acid leach process.

TABLE 8

| Solids Content (% wt/wt) | 26.7 |
|---|---|
| Solids <75 um (% wt/wt) | 22.5 |
| Specific Gravity | 1.21 |

Results

TABLE 9

| Sample | Dose (gpt) | r (mm) | c (mm) | e (mm) | Slump (%) | Released Water Volume (ml) | Released Water Turbidity (NTU) |
|---|---|---|---|---|---|---|---|
| Blank | 0 | >100 | 2 | n/a | <0.5 | 44 | >1000 |
| A | 330 | 80 | 11 | 3 | 10.0 | 59 | >1000 |
|  | 495 | 50 | 17 | 6 | 22.0 | 69 | 169 |
|  | 660 | 30 | 34 | 17 | 56.7 | 100 | 49 |
| C | 330 | 68 | 11 | 3 | 11.8 | 38 | 369 |
|  | 495 | 30 | 29 | 15 | 46.7 | 70 | 82 |
|  | 660 | 25 | 47 | 44 | 12.0 | 98 | 40 |
| E | 330 | 58 | 11 | 4 | 12.1 | 45 | 1000 |
|  | 660 | 25 | 43 | 23 | 80.0 | 92 | 27 |

EXAMPLE 5

Selected samples taken from example 1 were evaluated according to the procedures detailed in example 1 using a red mud tailings slurry obtained from a alumina refinery.

TABLE 10

| | |
|---|---|
| Solids Content (% wt/wt) | 27.4 |
| Solids <75 um (% wt/wt) | 26.7 |
| Specific Gravity | 1.25 |

Results

TABLE 11

| Sample | Dose (gpt) | r (mm) | c (mm) | e (mm) | Slump (%) | Released Water Volume (ml) | Released Water Turbidity (NTU) |
|---|---|---|---|---|---|---|---|
| Blank | 0 | 85 | 2 | n/a | <0.5 | 240 | >1000 |
| C | 874 | 83 | 5 | 4 | 0.6 | 10 | >1000 |
| E | 292 | 45 | 19 | 8 | 24.4 | 55 | 800 |
|  | 438 | 48 | 16 | 7 | 18.8 | 19 | 604 |
|  | 729 | 63 | 12 | 5 | 11.1 | 35 | NT |
| F | 584 | 73 | 8 | 3 | 6.8 | 19 | >1000 |
|  | 720 | 34 | 31 | 17 | 41.2 | 80 | 349 |
|  | 875 | 31 | 28 | 13 | 48.4 | 97 | 233 |
|  | 1022 | 31 | 32 | 12 | 64.5 | 92 | 222 |
| J | 583 | 68 | 12 | 5 | 10.3 | 91 | >1000 |
|  | 874 | 45 | 17 | 8 | 20.0 | 79 | 950 |
| W | 874 | 47 | 16 | 3 | 27.7 | 29 | 143 |

EXAMPLE 6

Selected samples taken from example 1 were evaluated according to the procedures detailed in example 1 using a tailings slurry obtained from a gold CIL/CIP processing operation

TABLE 12

| | |
|---|---|
| Solids Content (% wt/wt) | 53.3 |
| Solids <75 um (% wt/wt) | 35.4 |
| Specific Gravity | 1.58 |

Results

TABLE 13

| Sample | Dose (gpt) | r (mm) | c (mm) | e (mm) | Slump (%) | Released Water Volume (ml) | Released Water Turbidity (NTU) |
|---|---|---|---|---|---|---|---|
| Blank | 0 | >100 | 2 | n/a | <0.5 | 22 | >1000 |
| A | 119 | 49 | 14 | 7 | 14.3 | 32 | 38 |
|  | 238 | 52 | 12 | 7 | 9.6 | 48 | 95 |
|  | 356 | 45 | 18 | 7 | 24.4 | 20 | 266 |
| C | 238 | 40 | 22 | 8 | 35.0 | 20 | 256 |
|  | 356 | 28 | 38 | 21 | 60.7 | 28 | 42 |
| F | 238 | 39 | 22 | 8 | 35.9 | 18 | 497 |
|  | 356 | 25 | 40 | 23 | 68.0 | 45 | 22 |
| J | 119 | 39 | 22 | 8 | 35.9 | 18 | 497 |
|  | 238 | 25 | 40 | 23 | 68.0 | 45 | 22 |
|  | 356 | 39 | 22 | 8 | 35.9 | 18 | 497 |

EXAMPLE 7

Selected samples taken from example 1 were evaluated according to the procedures detailed in example 1 using a tailings slurry obtained from a lead/zinc mineral processing operation.

TABLE 14

| | |
|---|---|
| Solids Content (% wt/wt) | 53.4 |
| Solids <75 um (% wt/wt) | 45.8 |
| Specific Gravity | 1.52 |

Results

TABLE 15

| Sample | Dose (gpt) | r (mm) | c (mm) | e (mm) | Slump (%) | Released Water Volume (ml) | Released Water Turbidity (NTU) |
|---|---|---|---|---|---|---|---|
| Blank | 0 | 104 | 5 | 4 | 1.0 | 0 | n/a |
| A | 123 | 95 | 6 | 3 | 3.2 | 0 | n/a |
|  | 246 | 93 | 6 | 4 | 2.2 | 0 | n/a |
|  | 370 | 83 | 7 | 4 | 3.6 | 0 | n/a |
| C | 62 | 85 | 7 | 4 | 3.5 | 0 | n/a |
|  | 123 | 63 | 13 | 7 | 9.5 | 0 | n/a |
|  | 246 | 45 | 20 | 9 | 24.4 | 0 | n/a |
|  | 370 | 34 | 29 | 24 | 14.7 | 0 | n/a |
| E | 62 | 98 | 6 | 4 | 2.0 | 0 | n/a |
|  | 123 | 93 | 6 | 4 | 2.2 | 0 | n/a |
|  | 246 | 57 | 9 | 7 | 3.5 | 0 | n/a |
|  | 370 | 35 | 29 | 18 | 31.4 | 0 | n/a |

EXAMPLE 8

Selected samples taken from example 1 were evaluated according to the procedures detailed in example 1 using a tailings slurry obtained from a coal preparation plant. Due to the low solids of content of this sample, the slump cylinder size was increased to 50 mm diameter×100 mm height and 500 ml aliquots of substrate used. A clarity wedge was also used to assess the clarity of the released water.

TABLE 16

| | |
|---|---|
| Solids Content (% wt/wt) | 18.5 |
| Solids <75 um (% wt/wt) | 10.9 |
| Specific Gravity | 1.09 |

Results

TABLE 17

| Sample | Dose (gpt) | r (mm) | c (mm) | e (mm) | Slump (%) | Released Water Volume (ml) | Clarity (0-48) |
|---|---|---|---|---|---|---|---|
| Blank | 0 | >100 | 2 | n/a | <0.5 | 46 | 0 |
| A | 124 | >100 | 3 | n/a | <0.5 | 163 | 43 |
|  | 371 | 53 | 16 | 10 | 11.3 | 290 | >48 |
|  | 494 | 29 | 44 | 36 | 27.6 | 300 | >48 |
| C | 124 | 40 | 22 | 10 | 30.0 | 285 | 48 |
|  | 247 | 34 | 33 | 19 | 41.2 | 315 | 47 |
|  | 371 | 26 | 45 | 40 | 19.2 | 300 | 45 |
| E | 124 | 33 | 31 | 14 | 51.5 | 290 | >48 |
|  | 247 | 30 | 40 | 25 | 50.0 | 320 | 47 |
|  | 371 | 29 | 41 | 26 | 51.7 | 300 | 47 |

EXAMPLE 9

Laboratory Evaluation

Product 1 is an inverse emulsion containing a 80/20 sodium acrylate/acrylamide copolymer.

Product 1 was inverted into water to provide an aqueous solution containing 0.35% active polymer. The product was evaluated on a combination of fine and coarse tailings from a mineral sands operation according to the methods outlined in Example 1 above.

Fine solids fraction: thickener underflow @ 27.7% wt/wt
Coarse solids fraction: cyclone rejects @ 96.4% wt/wt Where possible, the blend of coarse and fine solids were diluted with water to a target solids of 43-47% wt/wt.

Results

TABLE 18

| Fine & Coarse Ratio | Total Solids (% wt/wt) | Product Dose (gpt) | "r" radius (mm) | "c" Height (mm) |
|---|---|---|---|---|
| 1:0 | 28 | 0 | 110 | 15 |
|  |  | 181 | 110 | 11 |
|  |  | 361 | 85 | 21 |
|  |  | 542 | 90 | 21 |
| 1:1 | 43 | 0 | 105 | 14 |
|  |  | 181 | 110 | 21 |
|  |  | 271 | 95 | 23 |
| 1:2 | 45 | 0 | >200 | <5 |
|  |  | 120 | 85 | 23 |
|  |  | 302 | 60 | 47 |

The results in Table 18 show the improved stacking of the treated compared to the untreated tailings. This is especially true for co-disposal of coarse and fine material with higher proportions of the coarse fraction.

EXAMPLE 10

Product 2A is an gel product consisting of a 30/70 sodium acrylate/acrylamide copolymer.

Product 2A was dissolved into water to provide an aqueous solution containing 0.25% product as supplied. The polymer was evaluated on a combined fine and coarse tailings from a coal preparation operation at a dosage of 740 gpt. The total solids content of the combined tails was approximately 19% wt/wt and approximately 1.4:1 fines/coarse ratio.

Treatment tests, employing the solution of Product 2B, were conducted using the following method:

1. 500 ml of the tails slurry was sampled into a 600 ml plastic beaker.
2. The slurry was then subjected to low shear mixing by pouring the sample from one 600 ml beaker to another to ensure that the sample was homogeneous.
3. The required dose of aqueous polymer solution was added to the tailings slurry and mixing continued until a consistent material was produced.
4. The material was transferred into a 500 ml measuring cylinder and left to compact for several days, after which the liberated water was decanted and discarded.
5. Sections were taken from the top and the bottom of the compacted solids and analysed to determine the particle size distribution of the solids in each section.

Figure 2:
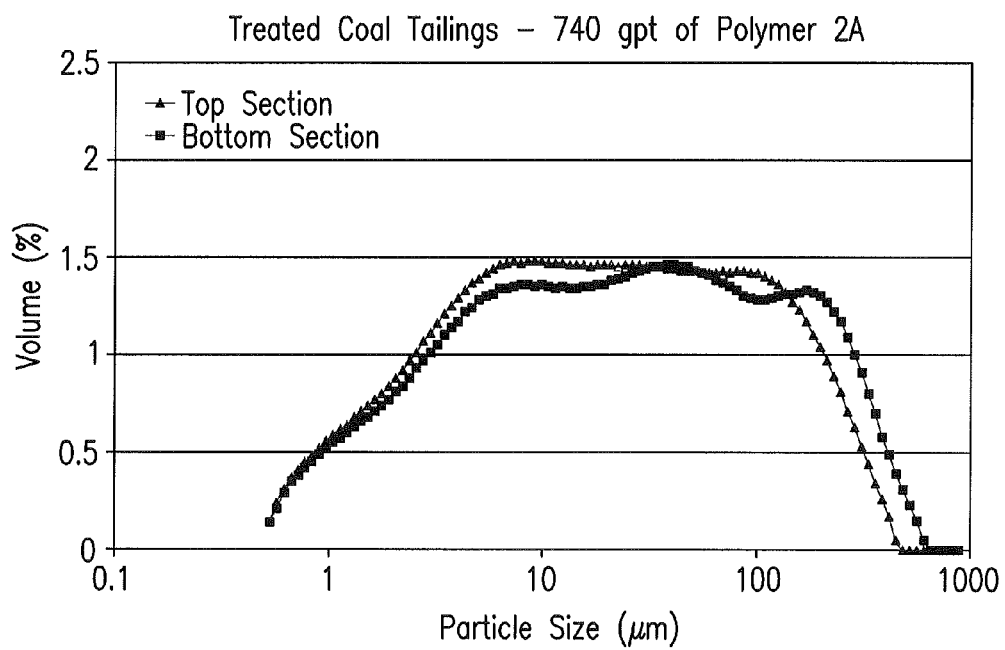

FIG. 1 shows that for the untreated material, a high degree of segregation in the compacted solids has occurred with the majority of the coarse particles only present in the bottom section of the sample. FIG. 2 shows that for the material treated with 740 gpt of Polymer 2A, the particle size distributions in both the top and the bottom sections are very similar, and only minimal segregation has occurred during compaction.

EXAMPLE 11

Product 2A was evaluated according to the procedures detailed in example 10 on a combined fine and coarse tailings from a gold CIL/CIP processing operation at a dosage of 240 gpt. The total solids content of the combined tails was approximately 53% wt/wt with approximately 2:1 fines/coarse ratio.

Results

Figure 3:
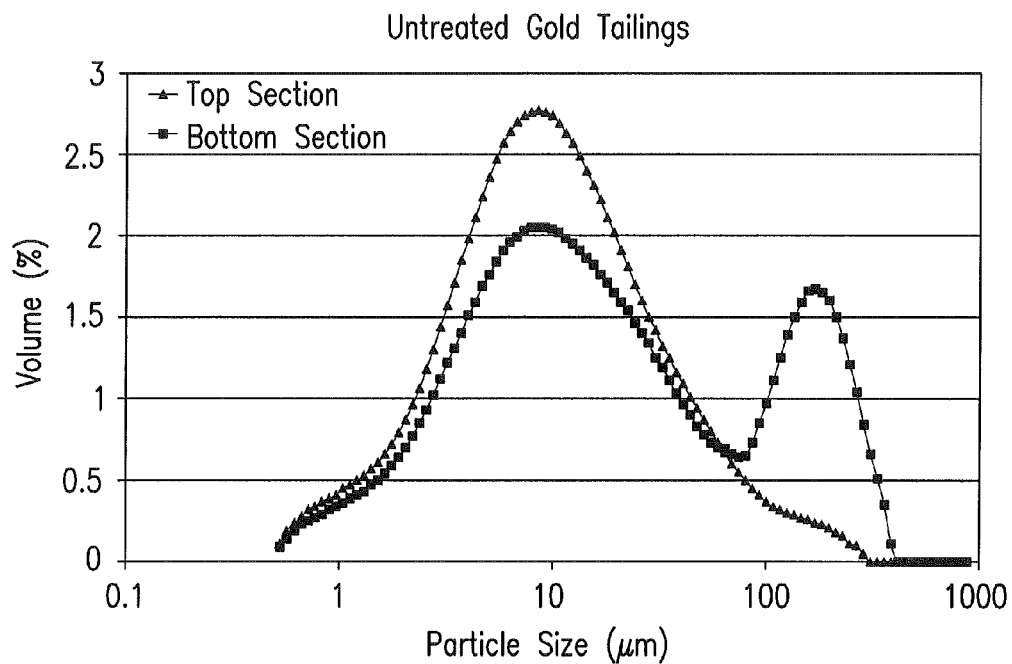
FIG. 3 and FIG. 4 graphically represent the particle size distribution of untreated and treated gold (240 gpt of Polymer 2A) tailings respectively from example 11.
Figure 4:
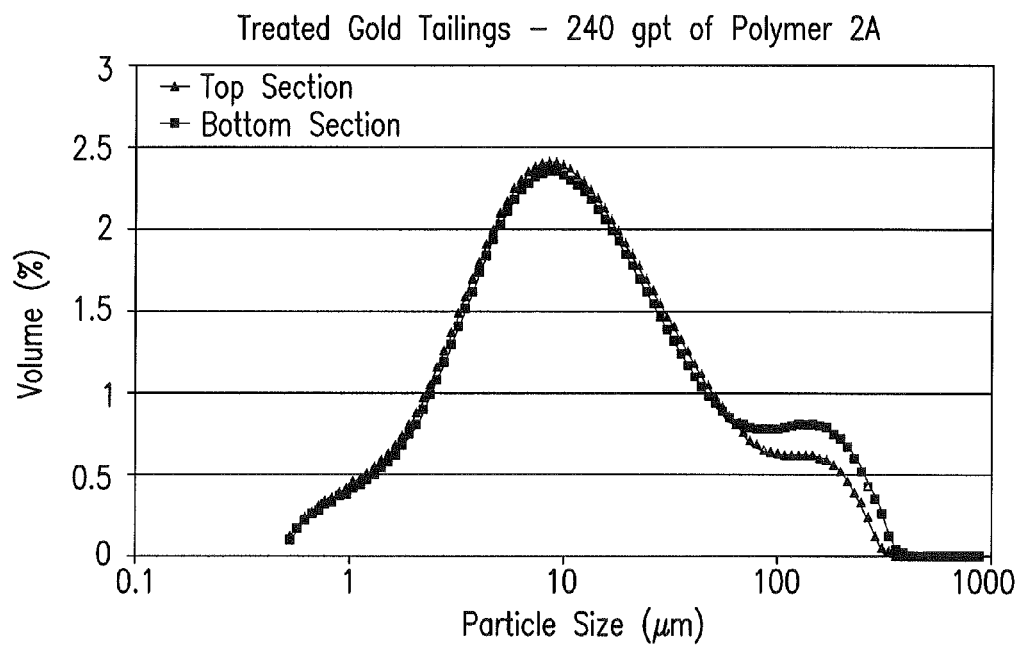

The particle size distribution in each section are represented graphically in FIGS. 3 and 4.

FIG. 3 shows a high degree of segregation of the coarse solids to the bottom section for the untreated material where as for the material treated with Polymer 2A, FIG. 4 shows that the top and bottom sections contain similar amounts of both coarse and fine particles.

EXAMPLE 12

Product 2B is an inverse emulsion containing a 30/70 sodium acrylate/acrylamide copolymer.

Product 2B was inverted into water to provide an aqueous solution containing 1.0% product as supplied. The polymer was evaluated on a combined fine and coarse tailings from a mineral sands operation. The total solids content of the combined tails was 53% wt/wt with a fines/coarse ratio of approximately 1:5.

Laboratory Evaluation

Treatment tests, employing the solution of Product 2B, were conducted using the following method:

1. Tails slurry is sampled into a 1 liter plastic bottle up to the graduation mark.
2. The slurry is then subjected to high shear mixing of ~1500 rpm using an overhead stirrer and a suitably machined marine impellor, in order to produce a vortex.
3. The required amount of polymer solution is added to the vortex of the slurry created by the high shear mixing.
4. The contents of the plastic bottle is allowed to mix for 1 minute.
5. After this period had elapsed, slurry is sampled into 250 ml plastic bottles, full to the neck, and these are subsequently tumbled at 25 rpm for X minutes.
6. At the appropriate times, Slump tests are carried out as per Example 1.

Results

TABLE 19

| Product | Dose Rate (gpt) | Mixing Time (min) | Slump Radius (mm) | Slump (%) |
|---|---|---|---|---|
| Blank | 0 | 5 | 146 | 0 |
|  |  | 10 | 152 | 0 |
|  |  | 15 | 145 | 0 |
| Product 2B | 50 | 5 | 80 | 12.5 |
|  |  | 10 | 85 | 7.1 |
|  |  | 15 | 130 | 0.4 |
|  | 100 | 5 | 45 | 53.3 |
|  |  | 10 | 73 | 13.8 |
|  |  | 15 | 90 | 2.8 |
|  | 150 | 5 | 35 | 97.1 |
|  |  | 10 | 48 | 50.5 |
|  |  | 15 | 83 | 8.5 |

Plant Evaluation

The tails from the Mineral Sands process is pumped uphill out of the lagoon-covered mining area to a raised tailings disposal area. The low viscosity of the waste stream together with the high flow rates means that solids are deposited over a great distance, and a long way from the discharge point. Scouring by the tailings stream also creates deep channelling in the disposal area. The fluidity of the flow endangers the operation of the mine since at maximum flows, the tails can flow back down into the mining area, swamping the lagoon and interfering with mining efficiency.

The application of this invention via the introduction of a 0.5% (as supplied) aqueous solution of a 30% anionic inverse emulsion polymer (Product 2B), at a dosage of 100 g/tonne of dry solids, into the pipeline feeding a mixed fines (thickener underflow) and coarse rejects slurry fractions at a rate of 20 and 50 lps respectively to the disposal area. Based on the above laboratory evaluation, a dosing point close (20 meters or 11 seconds) to the discharge point was chosen to minimise shearing of the treated material. This achieved a heap of treated material with a stacking angle of 8-10 degrees (measured using a surveyors inclinometer), clean water release and samples from the stack showing a high sub 75 micron content confirming a retention of the fine material within the heap disposal.

The discharge of the mineral sands tailings without and with treatment show the untreated tails to be highly mobile and with no deposition of solids at the point of discharge. Treated mineral sands tailings @ 100 gpt (Product 2B) show stacking of the treated tailings underneath the discharge point and the liberation of clean water in the foreground.

EXAMPLE 13

Product 2B is an inverse emulsion containing a 30/70 sodium acrylate/acrylamide copolymer as used in Example 12 above. Product 3 is a solution grade, sodium polyacrylate homopolymer.

Product 2B was inverted into water to provide an aqueous solution containing 1.0% product as supplied. Product 3 was used as supplied with no further dilution necessary. The polymers were evaluated on a combined fine and coarse tailings from a mineral sands operation. The solids of the combined tails was 67% wt/wt with a fines/coarse ratio of approximately 1:7.

Laboratory Evaluation

Treatment tests, employing the solution of Product 2B, and Product, 3 were conducted using the following method:

1. A 250 ml aliquot of the homogenous combined tails slurry is placed into a 500 ml beaker.
2. The slurry is then subjected to mixing of ~500 rpm using an overhead stirrer and a suitably machined paddle impellor.
3. The required dose of polymer is added to the slurry and mixing continued for either 10, 20 or 30 seconds.
4. Approximately 150 ml of the treated slurry is transferred to a 200 ml beaker and the yield stress measured using a vane viscometer.

Further tests were also carried out on Product 2B and 3 to evaluate the effect of different fines/coarse tailings ratio, using the above procedure and a constant mixing time of 20 seconds.

Results

TABLE 20

| Product | Dose (g/t) | Yield Stress (Pa) After Mixing | | |
|---|---|---|---|---|
|  |  | 10 sec | 20 sec | 30 sec |
| Blank | 0 | 65 | 64 | 63 |
| Product 2B | 53 | 109 | 103 | 90 |
|  | 107 | 217 | 183 | 115 |
|  | 160 | 356 | 290 | 211 |
| Product 3 | 622 | 97 | 105 | 95 |
|  | 888 | 181 | 200 | 168 |
|  | 1155 | 278 | 351 | 273 |

The results show that both products increased the yield stress of the combined mineral sands tails. Free water drainage was present at high doses.

Figure 5:
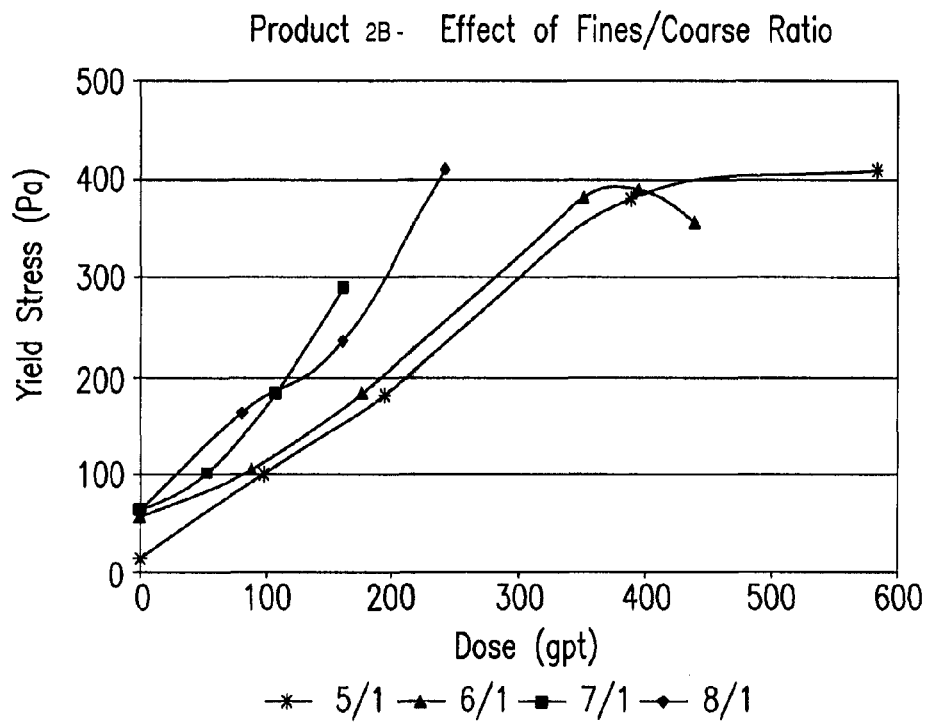
FIG. 5 and FIG. 6 graphically represent the effect of different fines to coarse tailings ratios. The results show that both. Product 2B (FIG. 5) and Product 3 (FIG. 6) at all ratios tested show increased yield stress of the mineral sands tailings.
Figure 6:
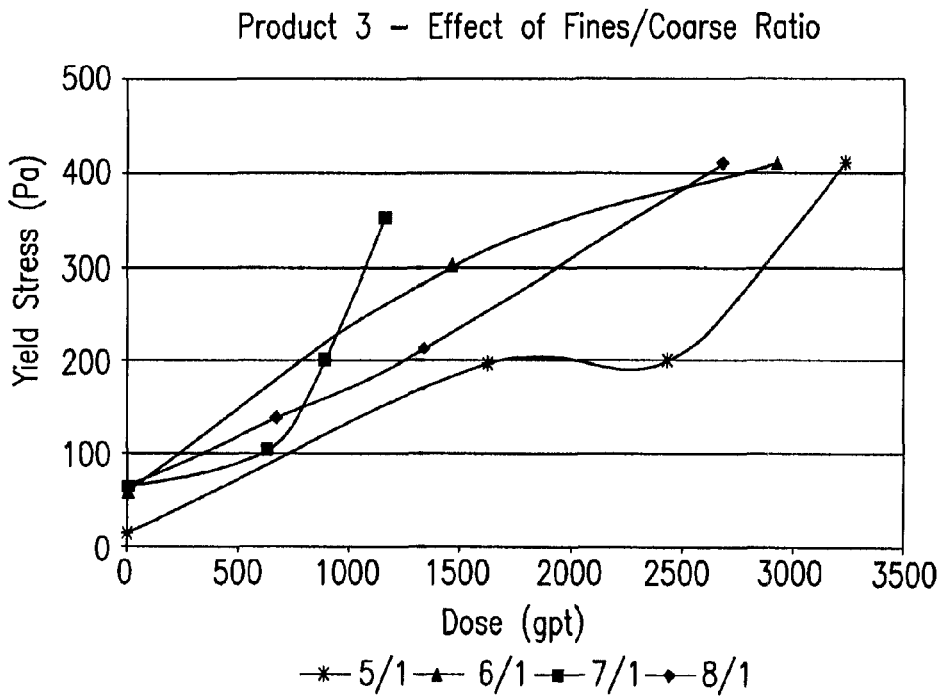

The effect of different fines to coarse ratios are represented in FIGS. 5 and 6. At all ratios tested, both Product 2B and Product 3 significant increased the yield stress of the mineral sands tailings.

Plant Evaluation

The underflow of a thickener in which slimes are compacted is combined with the waste sand fraction from the Mineral Sands operation. The ratio of sand to slimes varies with ore type, and the rheology and drainage rates of the deposited combination vary as a result.

The mining operation is mobile and follows the line of the ore body. The combined waste material is pumped to a series of pits that are filled sequentially and re-vegetated afterwards. It is desirable for the mining company to operate in as small a footprint as possible at any one time. Faster dewatering rates would allow the rehabilitation process to be started earlier. Additional drainage water could be returned to the process plant for improved efficiency's and reduced imported water costs.

The application of this invention at the site described above is as follows:

Product 3 was dosed at dosage of 1050 gpt over a three day period, added after the screw conveyer and before the small centrifugal pump. The result was an improved slump angle at discharge and much greater release of water from the slurry tails for the tails treated with 513 gpt and 1050 gpt respectively.

The dosing point was modified and Product 3 added directly after the centrifugal pump. The dosage was reduced to 726 g/T with the alternative position. The same sand consistency was generated using this point. 24 hours later the free drainage and porosity on the surface of the dam was apparent.

The invention claimed is:

1. A process of rigidifying a mineral material whilst retaining the fluidity of the material during transfer, in which the material comprises an aqueous liquid with dispersed particulate solids is transferred as an underflow from a thickener to a deposition area, then allowed to stand and rigidify and release aqueous liquid, by combining with the material an effective rigidifying amount of an aqueous solution of a water-soluble polymer having an intrinsic viscosity of at least 5 dl/g (measured in 1M NaCl at 25° C.), wherein the water-soluble polymer is anionic and is formed from ethylenically unsaturated water-soluble monomer or blend of monomers, and wherein the water-soluble polymer is formed from monomer(s) selected from the group consisting of (meth)acrylic acid, allyl sulphonic acid and 2-acrylamido-2-methyl propane sulphonic acid as the free acids or salts thereof, optionally in combination with non-ionic co-monomers, selected from the group consisting of (meth)acrylamide, hydroxy alkyl esters of (meth)acrylic acid and N-vinyl pyrrolidone.

2. A process according to claim 1 in which the process comprises the disposal of mineral slurry residues from a mineral processing operation.

3. A process according to claim 1, in which the material is derived from the tailings from a mineral sands process.

4. A process according to claim 1 in which the dispersed particulate solids have particle sizes less than 100 microns, in which at least 80% of the particles have sizes less than 25 microns.

5. A process according to claim 1 in which the dispersed particulate solids has a bimodal distribution of particle sizes comprising a fine fraction and a coarse fraction, in which the fine fraction peak is substantially less than 25 microns and the coarse fraction peak is substantially greater than 75 microns.

6. A process according to claim 1 in which the material has a solids content in the range 15% to 80% by weight.

7. A process according to claim 1 comprising flocculating an aqueous suspension of solids in a vessel to form a supernatant layer comprising an aqueous liquor and an underflow layer comprising thickened solids forming the material, separating the supernatant layer from the underflow, wherein the underflow containing the particulate material flows from the vessel and, in which the material is then pumped to a deposition area where it is allowed to stand and rigidify, and wherein the effective rigidifying amount of the aqueous solution of the water-soluble polymer is mixed with the material after flocculating the suspension and before the material is allowed to stand.

8. A process according to claim 7 in which wet or dry coarse particles are added to the underflow from the vessel either before or during the addition of an effective rigidifying amount of the water soluble polymer.

9. A process according to claim 7 in which the material is transferred to a holding vessel prior to being pumped to the deposition area.

10. A process according to claim 1 in which the material is pumped to an outlet, where it is allowed to flow over the surface of previously rigidified material, wherein the material is allowed to stand and rigidify to form a stack.

11. A process according to claim 1 in which the effective rigidifying amount of the aqueous solution of the water-soluble polymer is mixed with the material prior to a pumping stage.

12. A process according to claim 1 in which the effective rigidifying amount of the aqueous solution of the water-soluble polymer is mixed with the material during or subsequent to a pumping stage.

13. A process according to claim 10 in which the effective rigidifying amount of the aqueous solution of the water-soluble polymer is mixed with the material as it exits the outlet.

14. A process according to claim 1 in which the liquor is recycled to a mineral processing operation.

15. A process according to claim 1 in which the clarity of the liquor is improved by the addition of an aqueous solution of water-soluble polymer.

16. A process according to claim 1 in which the liquor contains dissolved valuable materials and, in which the liquor is subjected to further processing to reclaim or re-use the valuable materials.

17. A process according to claim 1, wherein the process provides a heaped geometry.

18. A process according to claim 1, wherein the process comprises codisposal of coarse and fine solids as a homogenous mixture.

19. A process according to claim 18, wherein the process provides a heaped geometry and water release has a higher driving force to separate it from the material by virtue of hydraulic gravity drainage.

* * * * *